(12) United States Patent
Ferrari et al.

(10) Patent No.: US 10,969,480 B2
(45) Date of Patent: Apr. 6, 2021

(54) METHOD AND SYSTEM FOR MAPPING A WORK SITE

(71) Applicant: CNH Industrial America LLC, New Holland, PA (US)

(72) Inventors: Luca Ferrari, Formigine (IT); Riccardo Morselli, San Vito di Spilamberto (IT)

(73) Assignee: CNH Industrial America LLC, New Holland, PA (US)

( * ) Notice: Subject to any disclaimer, the term of this patent is extended or adjusted under 35 U.S.C. 154(b) by 300 days.

(21) Appl. No.: 15/588,359

(22) Filed: May 5, 2017

(65) Prior Publication Data
US 2017/0322301 A1 Nov. 9, 2017

(51) Int. Cl.
*G01S 13/52* (2006.01)
*G01S 13/89* (2006.01)
(Continued)

(52) U.S. Cl.
CPC .............. *G01S 13/52* (2013.01); *G01S 7/003* (2013.01); *G01S 13/58* (2013.01); *G01S 13/86* (2013.01);
(Continued)

(58) Field of Classification Search
CPC .. G01S 13/89; G01S 13/931; G01S 2013/936; G01S 13/58; G01S 13/86; G01S 13/87; G01S 7/003; G01S 13/52–56; G01S 13/93–931; B60W 40/04; B60W 2550/408; B60W 2550/402; B60W 2550/10; B60W 2300/17; B60W 2556/50; B60W 2556/65
See application file for complete search history.

(56) References Cited

U.S. PATENT DOCUMENTS 7,924,215 B2 * 4/2011 Nakanishi .............. G08G 1/167
342/109
8,630,805 B2 * 1/2014 Becker ................. G01S 13/867
342/179
(Continued)

FOREIGN PATENT DOCUMENTS

DE 102015202837 8/2015

OTHER PUBLICATIONS

European Search Report for Italian Application No. 102016000046667 dated Jan. 16, 2017 (7 pages).

*Primary Examiner* — Matthew M Barker
(74) *Attorney, Agent, or Firm* — Rickard K. DeMille; Rebecca L. Henkel

(57) ABSTRACT

An electronic system for mapping a work site that includes a plurality of radar sensors to be provided on vehicles moving on the site, the radar sensors being able to detect objects included in a respective area of detection and acquire their relative positions. The system includes a speed module configured for determining a speed parameter for objects detected by the radar sensors, according to their relative positions. The system also includes a classification module configured for classifying detected objects as standing still or moving objects according to the respective speed parameters, and a map module configured for creating a common map of the site providing the positions of standing still objects detected in the site by said plurality of radar sensors, according to a reference system.

14 Claims, 2 Drawing Sheets

(51) Int. Cl.
*G01S 13/87* (2006.01)
*G01S 13/86* (2006.01)
*G01S 13/58* (2006.01)
*G01S 7/00* (2006.01)

(52) U.S. Cl.
CPC .............. *G01S 13/87* (2013.01); *G01S 13/89* (2013.01); *B60W 2300/17* (2013.01)

(56) References Cited

U.S. PATENT DOCUMENTS

| | | | |
|---|---|---|---|
| 9,201,421 B1* | 12/2015 | Fairfield | B60W 40/04 |
| 9,384,388 B2* | 7/2016 | Ichida | G08G 1/165 |
| 2008/0243378 A1* | 10/2008 | Zavoli | G01C 21/28 |
| | | | 701/533 |
| 2012/0271540 A1* | 10/2012 | Miksa | G01C 21/30 |
| | | | 701/409 |
| 2015/0266472 A1* | 9/2015 | Ferguson | G01C 21/3461 |
| | | | 701/23 |
| 2015/0293216 A1 | 10/2015 | O'Dea et al. | |
| 2015/0336575 A1 | 11/2015 | Zeng | |
| 2016/0001775 A1 | 1/2016 | Wilhelm et al. | |
| 2016/0082978 A1 | 3/2016 | Ozaki et al. | |
| 2016/0180171 A1* | 6/2016 | Kamata | G06K 9/00657 |
| | | | 382/103 |
| 2016/0355192 A1* | 12/2016 | James | B60W 50/082 |
| 2017/0123428 A1* | 5/2017 | Levinson | G05D 1/0214 |
| 2018/0321377 A1* | 11/2018 | Sudhakar | G06F 16/29 |
| 2019/0250263 A1* | 8/2019 | Watanabe | G01S 7/2927 |

* cited by examiner

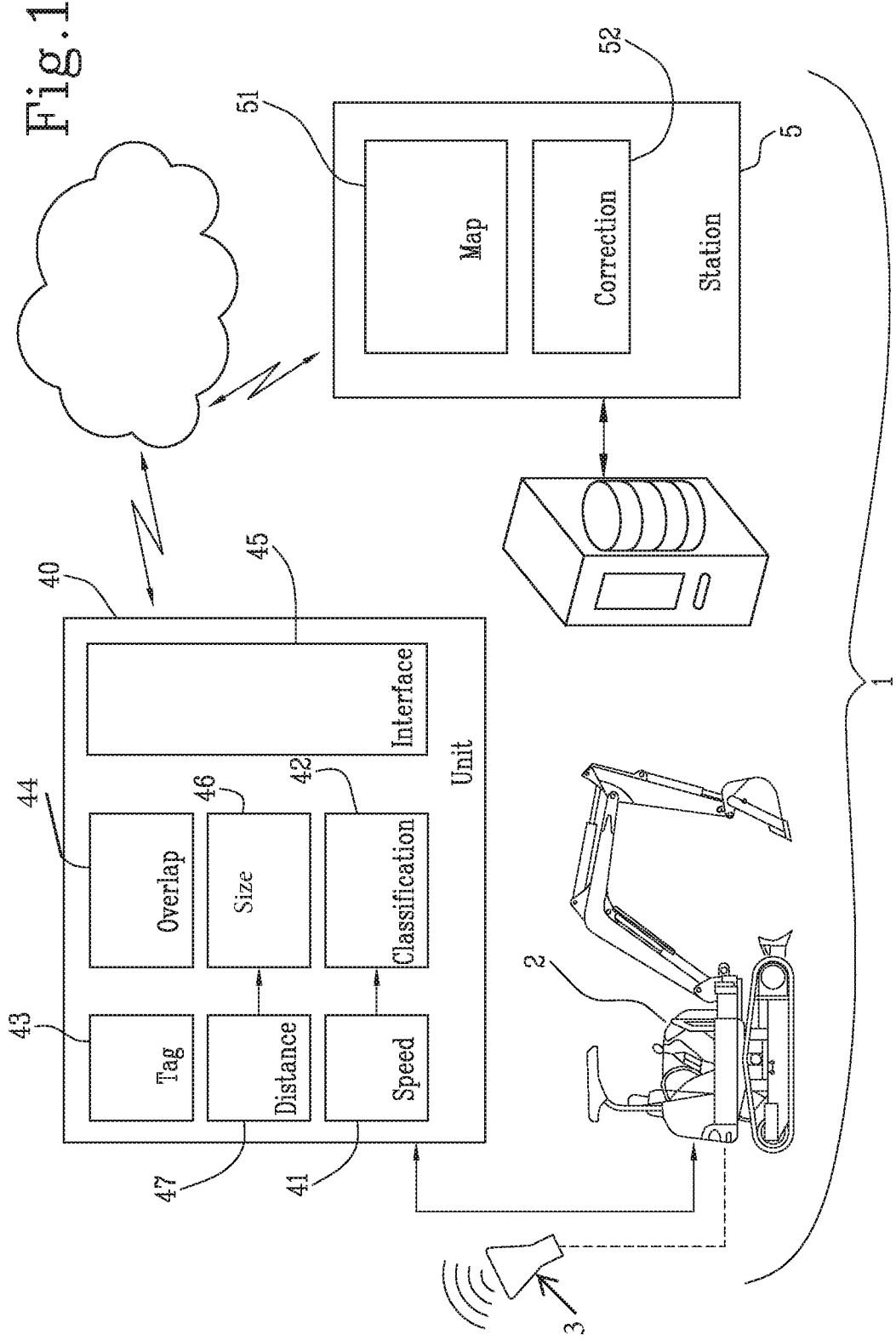

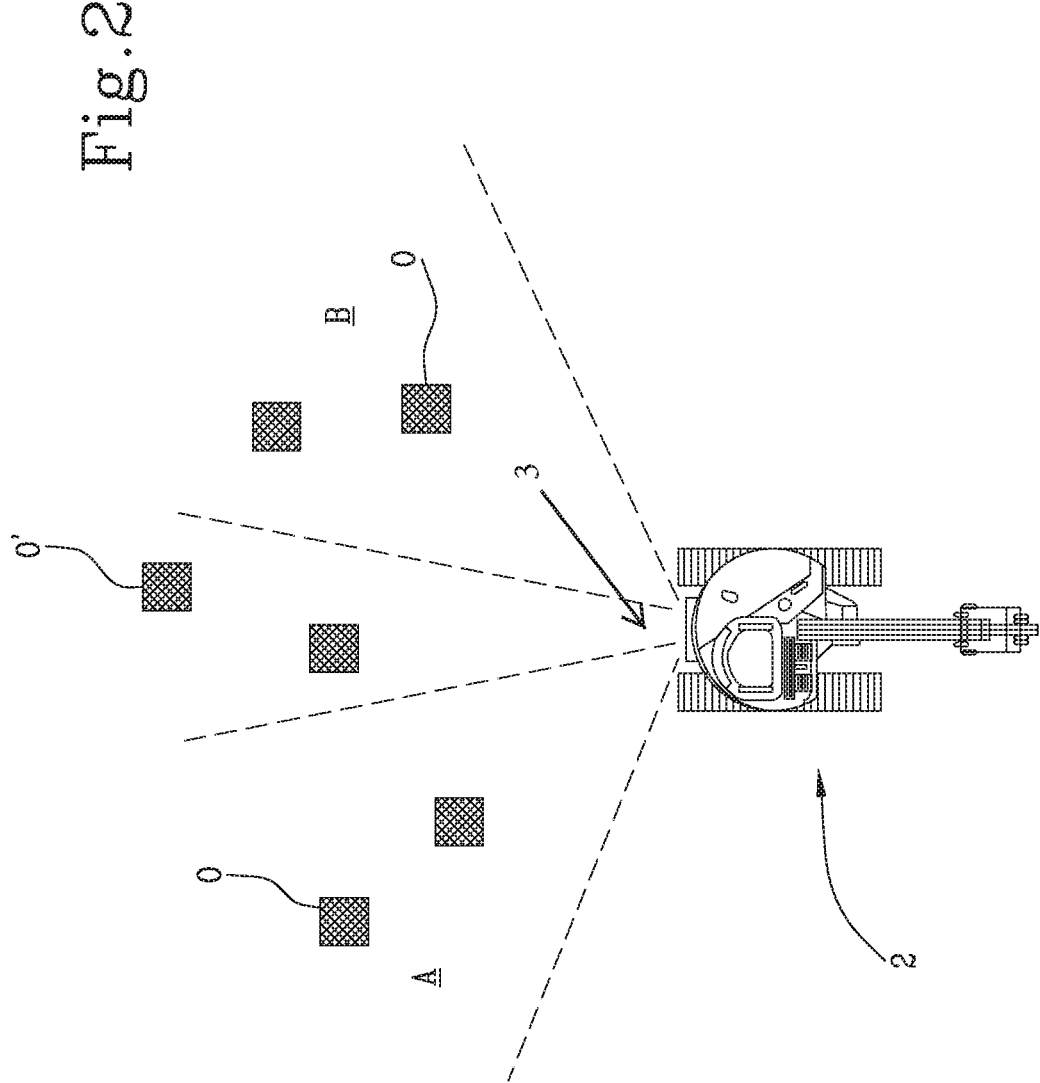

METHOD AND SYSTEM FOR MAPPING A WORK SITE

PRIORITY CLAIM

This application claims priority to Italian Patent Application No. 102016000046667, entitled "METHOD AND SYSTEM FOR MAPPING A WORK SITE," filed May 6, 2016, which is incorporated herein by reference.

BACKGROUND

The invention relates to a method and system for mapping work sites, in particular agricultural or a construction sites. In detail, the invention relates to the mapping of a work site by means of vehicles running thereon, particularly construction vehicles, like excavators or the like and agricultural vehicles, such as tractors, combines, etc.

It is well known that one of the main concerns of the operator driving an excavator in a construction site, is to avoid to run into a building or a pole or another obstacle. This is especially critical when the operator drives in reverse, because of the limited visibility. Similar problems arise when an operator is driving a tractor in an agricultural field.

Currently, the operators working for many days in the same site, try to remember the peculiarities of this site, namely the positions of various fixed objects which may obstacle the operations and or be source of collision risk. Also, the operator, during lunch breaks, or similar occasions, share the information about the positioning of these fixed objects. However, this is not a reliable system for preventing possible collisions and for avoiding to go through inefficient complicated maneuvers in order to move through the working site.

It is an object of the present invention to provide an apparatus and a method for mapping a site, particularly a working site, able to satisfy the above-cited need. This object is achieved by the system realized in accordance with claim 1 and by the method carried out according to claim 12.

DRAWINGS

These and other features, aspects, and advantages of the present invention will become better understood when the following detailed description is read with reference to the accompanying drawings in which like characters represent like parts throughout the drawings, wherein:

FIG. 1 is a diagram representing the system of the invention.

FIG. 2 is a schematic representation of a vehicle associated with the system, comprising two sensors.

DETAILED DESCRIPTION

With reference to the aforementioned figures, 1 indicates an electronic system for mapping a work site according to the invention. The system 1 has been devised to map e.g. a construction site, exploiting the presence of working vehicles 2 operating in the site.

The system 1 includes a plurality of radar sensors 3 provided on board of the vehicles 2 moving on the site. The radar sensors 3 of the invention are able to detect objects O, O' included in a respective area of detection A, B and are also able to acquire the relative positions of the detected objects. In detail, each radar sensor 3 can be placed at the back portion of the respective vehicle 2. The area of detection A, B can be a portion of the overall zone surrounding the vehicle 2, such as the area where the vehicle 2 can go when moving in reverse driving.

The system 1 preferably includes also at least one processing unit, and preferably a plurality of processing units, including a plurality of operating modules and at least a memory module. Please note that, in the present description, the processing units are presented as articulated into distinct operative modules in order to describe them in a clear and complete way. In practice, each processing unit may be constituted by a single electronic device, also of the type commonly present on this type of machines (like an ECU), programmed to perform the functionalities described. Different modules can correspond to respective hardware entities and/or software routines that are part of the programmed device.

Alternatively or in addition, such features can be carried out by a plurality of electronic devices on which the aforesaid operative modules are included. In general, the processing units may use one or more microprocessors for the execution of instructions contained in memory modules and the above operative modules can also be distributed over a plurality of computers in a local or remote according to the network architecture in which they are provided. Preferably, each vehicle 2 mounts a mapping apparatus including at least one radar sensor 3 and an individual processing unit 40 connected to the sensor 3.

The electronic system 1 includes one or more speed modules 41 configured for determining a speed parameter for objects O, O' detected by said radar sensors 3, according to their relative positions. Preferably, each sensor 3 is associated to a respective speed module 41 included in the individual processing unit 40 of the relative vehicle 2.

The system 1 of the invention also includes one or more classification module 42 configured for classifying detected objects as standing still or moving objects according to the respective speed parameters. Again, preferably, each vehicles 2 has its own classification module 42 comprised in the above-said individual unit 40. A detailed explanation of possible modes for classifying the detected objects will be presented later in this description.

According to an important aspect of the invention, at least a map module 51 is provided, which is configured for creating a common virtual map of the site. In detail, the common map provides the positions of standing still objects detected in the site by the radar sensors 3, according to a reference system, and according to the outcomes of the classification modules 42. Basically, the electronic system 1 of the invention has been devised to produce a map of the working site, which is created as the vehicles 2 run through the site during their working operations. This map is common for all the operators driving a vehicle 2 which is part of the network of the system 1 of the invention. In this way, each mapping apparatus of the vehicles 2 involved contributes to the creation of the map with the detections performed, whereas the resulting map is shared to all the operators driving those vehicles 2.

According to a particular embodiment of the invention, a central processing station 5 is provided, which comprises said map module 51. This central station 5 can be a remote unit or one of the individual processing units 40 mounted on the different vehicles 2. Other embodiments are possible in which a plurality of individual units 40 include respective map modules 51 and no central station 5 is provided. Said central processing station 5 can also be able to collect/share information with the mapping apparatuses 4. In this case, the map module 51 of the central station 5 is configured for producing a single common map of the site according to the information collected from the different mapping apparatuses. Please note that one or more (or each of the) mapping apparatus comprises a telecommunication device for collecting/sharing information to/from other apparatuses 4, and possibly the central station 5, relating to the detected objects.

According to a particular embodiment of the invention, one or more (or each of the) mapping apparatuses 4 includes at least two radars sensors 3 in order to widen the overall detection range (see FIG. 2). In this case, preferably, the sensors 3 are such pointed so as to have overlapping areas A, B of detection. Preferably, the invention provides at least an overlap module 44 configured for determining common standing still objects O' detected in areas of detection A, B of different radar sensors 3 or of the same radar sensor 3 in different moments. The reference system of the map module 51 can be obtained using one or more satellite positioning device (e.g. GPS devices) connected to the map module 51 itself.

Preferably, each mapping apparatus on board of a respective vehicle 2 comprises a satellite positioning device. In this case, the system 1 of the invention comprises one or more tag modules 43 configured for calculating geographic coordinates of objects detected by the sensors 3 according to absolute geographic coordinates of the respective vehicle 2. In this embodiment, the system 1 is able to associate absolute geographical coordinates to the mapped objects. In particular, each individual processing unit 40 of the vehicles 2 moving in the site can be provided with a tag module 43 so as to "tag" each object detected, in particular standing still objects, with their absolute coordinates calculated from the absolute coordinates of the vehicles 2 obtained by the satellite devices. Preferably, the invention also comprise a map correction module 52 configured to change the common map according to intervening changings in the classification of mapped objects provided by the above-said classification module 42. Basically, if a vehicle 2 passes near the spot of the site, where, according to the common virtual map, a standing still object should be present, and its mapping apparatus detects no object, then said correction module 52 would update the map according to the current state of the site.

The functioning of the invention is as follows.

During the working operations in a construction site or other work sites, one or more vehicles 2 move in the site. At the beginning, the site is completely "uncharted" and so the operators have to pay particular attention to the positions of the various objects O, O' located in the site, like buildings, poles or other similar obstacles which my interfere with the operations and represent a risk of collision.

As the working day proceeds, the vehicles 2 run different paths through the site and, in the meantime, they start to detect various objects, in particular standing still objects, and shares the information with the map module 51 so that it will continuously produce the common map. After a few hours, a good part of the site, or at least of its areas crossed by the vehicles 2, is mapped and the operators, via e.g. interface means 45 like display or the like, can see where possible obstacles are and so they can decide easily and efficiently the best maneuvers to perform when driving in that site. After a few days, great part of the useful portions of site are mapped, which improve not only the safety of the workers but made the moving of the vehicles 2 much more efficient.

In the following section, preferred but optional ways of obtaining the classification of detected object via the invention are described.

As anticipated, by means of the respective speed module 41, each apparatus can acquire information that can be used to determine whether a given object is standing still, like e.g. a post or a building, etc. or it is moving/movable. The individual processing unit 40 of the apparatus can also include a size module 46 configured for determining a size parameter for each object, according to a signal produced by the radar sensor 3. In fact, the radar sensor 3 produces an output electronic signal according to the detection performed, which is sent to the individual processing unit 40, where it is processed by the size module 46.

Preferably, the individual processing unit 40 also comprises a distance module 47 connected to the sensor 3 (or sensors) and configured to calculate the distances between each object and the apparatus (so roughly the position of the respective vehicle 2). Most preferably, the distance module 47 is configured for calculating the distances of the objects along their radial directions passing through the radar sensor 3; in the following, this distance value will be named "radial distance". In this case, the classification module 42 can be configured to classify different objects according to the respective speed and the size parameters. In fact, the Applicant discovered that a realistic assumption of the type of the objects a vehicle 2 have to deal with in a work site is achievable knowing their sizes and speeds.

By way of example, if an object stands still and is very large, it might be a wall, whereas if it is very small and is moving slow can be a pedestrian, while if it's small/medium sized and is moving can be another vehicle, etc. . . . More in detail, said size parameter can be calculated according to a relation between said magnitude and said relative distance of the object. In detail, said relation can be the ratio between the magnitude and the relative distance or a different mathematical relation.

More preferably, the size module 46 is configured for determining the size parameter calculating the ratio between the magnitude of said output signal and the square of the detected distance of a given object, particularly said radial distance. Thus, by means of trials and in-field tests, it is possible to determine for each type of object corresponding ranges in speed and size parameters and accordingly program the classification module 42, so that an automatic classification of the objects can be done during the use of the vehicle 2.

In a possible embodiment, the speed module 41 is configured for determining said speed parameter according to a speed component relative to a radial direction of each objects passing through the radar sensor 3. In this case, said radial direction can be determined according to an azimuth angle between each object and a reference direction, the latter being fixed with respect to radar sensor 3, whereas said azimuth angle being determined according to the positions detected by the radar sensor 3. Said reference direction is preferably the axial direction of the vehicle 2 or is parallel to the axial direction and passes through the apparatus. Preferably, the speed parameter in the radial direction is the relative speed between the vehicle 2 and the object or is a function of that relative speed. This relative "radial speed" between the vehicle 2 and the object can be used by the classification module 42 to determine whether an object is standing still or not. In fact, the classification module 42 can be configured for comparing said relative radial speed with the speed (component) of the vehicle 2 in said radial direction (i.e. the radial speed of the vehicle 2), calculated by means of e.g. known speed sensors usually provided on the vehicle 2.

For example, if the radial speed of the vehicle 2 is different from zero and the relative radial speed is equal to the vehicle 2 radial speed, than it is reasonable to assume that the object is standing still. If the radial speed of the vehicle 2 is different from zero and the relative radial speed is different from the vehicle 2 radial speed, then it is reasonable to assume that the object is moving.

In another possible embodiment, the classification module 42 is configured for determining whether an object is standing still according to its speed relative to a plurality of objects being fixed to each other. In detail, taking into consideration (at least) two objects known as standing still, and considering the position of one of this standing still object as the origin of a coordinate system 1, any other further object (a third object, for instance) can be assumed as standing still if its relative speed relative to the two reference standing still objects equals zero. Then that further object becomes a reference standing still object, itself and so on.

In the same embodiment, a variation is possible in which the classification module 42 is configured for using a combination of the relative speed, the vehicle 2 radial speed and the size parameter. The invention also provides a method for mapping a work site, which can be carried out by the electronic system 1.

The method comprises the following steps: providing a plurality of radar sensors 3 to be mounted on vehicles 2 moving on said site, said sensors 3 being able to detect objects O, O' included in a respective area A, B of and acquire their relative positions; determining speed parameters for objects O, O' detected by the radar sensors 3, according to their relative positions; classifying the detected objects O, O' as standing still or moving objects according to the respective speed parameters; and creating a common map of the site providing the positions of standing still objects detected, according to a reference system.

Please note that, optional further steps of the proposed method corresponds to actions or functions performed by the optional modules of the electronic system 1 as above described in detail.

In particular, the method of the invention can also include following step: determining common standing still objects detected in areas of detection A, B of different radar sensors 3 or of the same radar sensor 3 in different moments.

Further, one or more of the following steps can be carried out by the proposed method: updating the common map according to intervening changings in the classification of mapped objects; providing a plurality of vehicles 2, each mounting at least a radar sensor 3, and creating the common map according to the detections carried out by all the sensors 3; providing one or more vehicle 2 mounting at least two radar sensors 3 such pointed so as to have overlapping areas A, B of detection; and calculating geographic coordinates of objects detected by the sensors 3 according to geographic coordinates associated to the vehicle 2 and associate the calculated coordinates to the mapped objects.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An electronic system for mapping a work site that comprises a plurality of radar sensors provided on a plurality of vehicles performing work operations on the work site, the plurality of radar sensors being able to detect objects included in respective areas of detection and acquire the positions of the detected objects relative to at least one of the plurality of vehicles performing work operations, wherein the electronic system is configured to:

determine respective speed parameters for a first set of objects detected by the plurality of radar sensors, according to their positions relative to at least one of the plurality of vehicles performing work operations;

classify the detected objects in the first set of objects as standing still or moving objects according to the respective speed parameters for the first set of objects;

create a common map of the work site providing the positions of the standing still objects in the first set of objects detected in the work site by the plurality of radar sensors on the plurality of vehicles performing work operations on the work site, according to a reference system; and determine a speed of a later-detected object detected by the plurality of radar sensors after detection of the objects in the first set of objects, wherein the speed of the later-detected object is determined relative to at least two standing still objects in the first set of objects;

classify the later-detected object as a later-detected standing still object if the speed of the later-detected object relative to the at least two standing still objects in the first set of objects is zero;

continuously update, while the plurality of vehicles are performing the work operations on the work site, the common map according to intervening changings in the classification of the mapped objects in the first set of objects and to include the later-detected standing still object.

2. The electronic system according to claim 1, wherein the electronic system is configured to determine common standing still objects detected in the respective areas of detection of different radar sensors of the plurality of radar sensor or of the same radar sensor of the plurality of radar sensors in different moments.

3. The electronic system according claim 1, further comprising at least a satellite positioning device configured to provide the reference system.

4. The electronic system according to claim 1, comprising the plurality of vehicles each mounting a mapping apparatus including at least a radar sensor of the plurality of radar sensors and an individual processing unit connected to the radar sensor.

5. The electronic system according to claim 4, wherein one or more of the plurality of vehicles mount the mapping apparatus including at least two radar sensors of the plurality of radar sensors such pointed so as to have overlapping areas of detection.

6. The electronic system according to claim 5, wherein each mapping apparatus comprises a telecommunication device for collecting and sharing information to and from other apparatuses relating to the detected objects in the first set of objects and the later-detected object.

7. The electronic system according to claim 6, further comprising at least a central processing station configured to collect and share information with the mapping apparatuses, and the electronic system being configured to produce the common map of the work site according to the information collected from the different mapping apparatuses.

8. The electronic system according to claim 4, further comprising at least a satellite positioning device configured to provide the reference system.

9. The electronic system according to claim 8, wherein each mapping apparatus comprises a respective satellite positioning device, the electronic system being configured to calculate geographic coordinates of the objects of the first set of objects and the later-detected object detected by the plurality of radar sensors according to geographic coordinates of a respective vehicle of the plurality of vehicles, and the electronic system is further configured to associate the calculated geographic coordinates with the mapped objects of the first set of objects and the later-detected object.

10. A method for mapping a work site, comprising the steps of:
providing a plurality of radar sensors to be mounted on a plurality of vehicles performing work operations on the work site, the plurality of radar sensors being able to detect objects included in respective areas of detection and acquire their positions relative to at least one of the plurality of vehicles performing work operations;
determining respective speed parameters for a first set of objects detected by the plurality of radar sensors, according to their positions relative to at least one of the plurality of vehicles performing work operations;
classifying the detected objects in the first set of objects as standing still or moving objects according to the respective speed parameters;
creating a common map of the work site providing the positions of the standing still objects in the first set of objects detected in the work site by the plurality of radar sensors on the plurality of vehicles performing work operations on the work site, according to a reference system; and
determining a speed of a later-detected object detected by the plurality of radar sensors after detection of the objects in the first set of objects, wherein the speed of the later-detected object is determined relative to a least two standing still objects in the first set of objects;
classifying the later-detected detected object as a later-detected standing still object if the speed of the later-detected object relative to the at least two standing still objects in the first set of objects is zero;
continuously updating, while the plurality of vehicles are performing the work operations on the work site, the common map according to intervening changings in the classification of the mapped objects in the first set of objects and to include the later-detected standing still object.

11. The method according to claim 10, further comprising the step of determining common standing still objects detected in the respective areas of detection of different radar sensors of the plurality of radar sensors or of the same radar sensor of the plurality of radar sensors in different moments.

12. The method according to claim 10, wherein the plurality of vehicles are provided, each mounting at least a radar sensor of the plurality of radar sensors, the common map being created according to the detections carried out by all the plurality of radar sensors.

13. The method according to claim 12, wherein one or more vehicles of the plurality of vehicles mount at least two radar sensors of the plurality of radar sensors such pointed so as to have overlapping areas of detection.

14. The method according to claim 13, further comprising the steps of: calculating geographic coordinates of the objects of the first set of objects and the later-detected object detected by the plurality of radar sensors according to geographic coordinates associated with a respective vehicle of the plurality of vehicles and associate the calculated geographic coordinates with the mapped objects of the first set of objects and the later-detected object.

* * * * *